US006814906B2

(12) United States Patent
Bergeron et al.

(10) Patent No.: US 6,814,906 B2
(45) Date of Patent: Nov. 9, 2004

(54) APPARATUS AND METHOD FOR MOLDING BLOCKS

(75) Inventors: Rene Bergeron, Laval (CA); Stanley Nelson, Alpena, MI (US); Denelle Shultz, Alpena, MI (US)

(73) Assignee: Besser Company, Alpena, MI (US)

( * ) Notice: Subject to any disclaimer, the term of this patent is extended or adjusted under 35 U.S.C. 154(b) by 281 days.

(21) Appl. No.: 10/146,167

(22) Filed: May 15, 2002

(65) Prior Publication Data

US 2002/0125593 A1 Sep. 12, 2002

Related U.S. Application Data

(62) Division of application No. 09/565,812, filed on May 5, 2000, now Pat. No. 6,425,751.

(60) Provisional application No. 60/140,082, filed on Jun. 21, 1999.

(51) Int. Cl.[7] .......................... B28B 7/00; B28B 1/087; B29C 33/72

(52) U.S. Cl. .......................... 264/39; 264/71; 264/333; 425/226; 425/227; 425/228; 425/260

(58) Field of Search .......................... 264/39, 71, 333; 425/225, 226, 227, 228, 229, 260

(56) References Cited

U.S. PATENT DOCUMENTS

| | | | | |
|---|---|---|---|---|
| 158,728 A | | 1/1875 | Moorwood | 249/162 |
| 217,405 A | | 7/1879 | Rapp | 425/412 |
| 835,737 A | | 11/1906 | Simmons et al. | 425/228 |
| 912,829 A | | 2/1909 | Diaz | 425/468 |
| 950,811 A | | 3/1910 | Zurbuch | 425/225 |
| 1,626,447 A | * | 4/1927 | Bramin | 264/310 |
| 1,835,914 A | | 12/1931 | Stockdale | 425/99 |
| 1,905,619 A | | 4/1933 | Carton | 425/556 |
| 1,993,942 A | * | 3/1935 | Novotny | 264/39 |

(List continued on next page.)

FOREIGN PATENT DOCUMENTS

JP 04-005368 A * 1/1992 .......... B28B/21/00

OTHER PUBLICATIONS

JPO abstract of JP 04–005368 A, 1998, Japanese Patent Office.*

*Primary Examiner*—Leo B. Tentoni
*Assistant Examiner*—Michael I. Poe
(74) *Attorney, Agent, or Firm*—Reising, Ethington, Barnes, Kisselle & Learman, P.C.

(57) ABSTRACT

Apparatus for molding blocks with laterally projecting, undercut side features includes a mold box having split mold parts defining a mold cavity open at the top and bottom. A top plate having an opening aligned with a cavity overlies the mold parts. Moldable block material is charged into the cavity from a feed box, and the material is compacted and shaped between a lower pallet and upper stripper head. The mold parts are retractable beneath the top plate to release the block for stripping through the bottom of a mold. A plurality of fluid outlets in the top plate cleanse the mold surfaces of the block material between mold cycles.

3 Claims, 8 Drawing Sheets

U.S. PATENT DOCUMENTS 2,499,209 A 2/1950 Balasquide .................. 425/99
2,566,787 A 9/1951 Zevely ....................... 425/253
2,652,613 A 9/1953 Warren ....................... 425/167
2,716,070 A * 8/1955 Seipt ........................... 264/39
3,010,173 A 11/1961 Culver ....................... 425/451
3,248,762 A 5/1966 Wagner ...................... 164/158
3,305,907 A 2/1967 Baker .......................... 425/99
3,407,444 A 10/1968 Rees .......................... 425/155
3,600,481 A * 8/1971 Lanz ........................... 264/30
3,679,340 A 7/1972 Springs ...................... 425/163
3,941,537 A 3/1976 Abraham .................... 425/228
4,012,827 A 3/1977 Abrams ....................... 29/453
4,090,837 A 5/1978 Balevski et al. ............ 425/588
4,242,299 A 12/1980 Adams
4,321,028 A 3/1982 Van de Caveye ........... 425/217
4,424,951 A 1/1984 Spencer
4,755,128 A 7/1988 Alexander et al.
4,975,041 A 12/1990 Fries et al.
4,983,115 A * 1/1991 Yamasaki et al. ............. 264/39
5,022,839 A 6/1991 Brussel ....................... 425/161
5,482,721 A 1/1996 Clark et al.
5,540,576 A 7/1996 Kawakita et al.
5,540,869 A 7/1996 Aaseth et al. ............ 264/37.19
5,942,181 A 8/1999 Rondeau ..................... 264/504
6,676,863 B2 * 1/2004 Christiaens et al. .......... 264/39

* cited by examiner

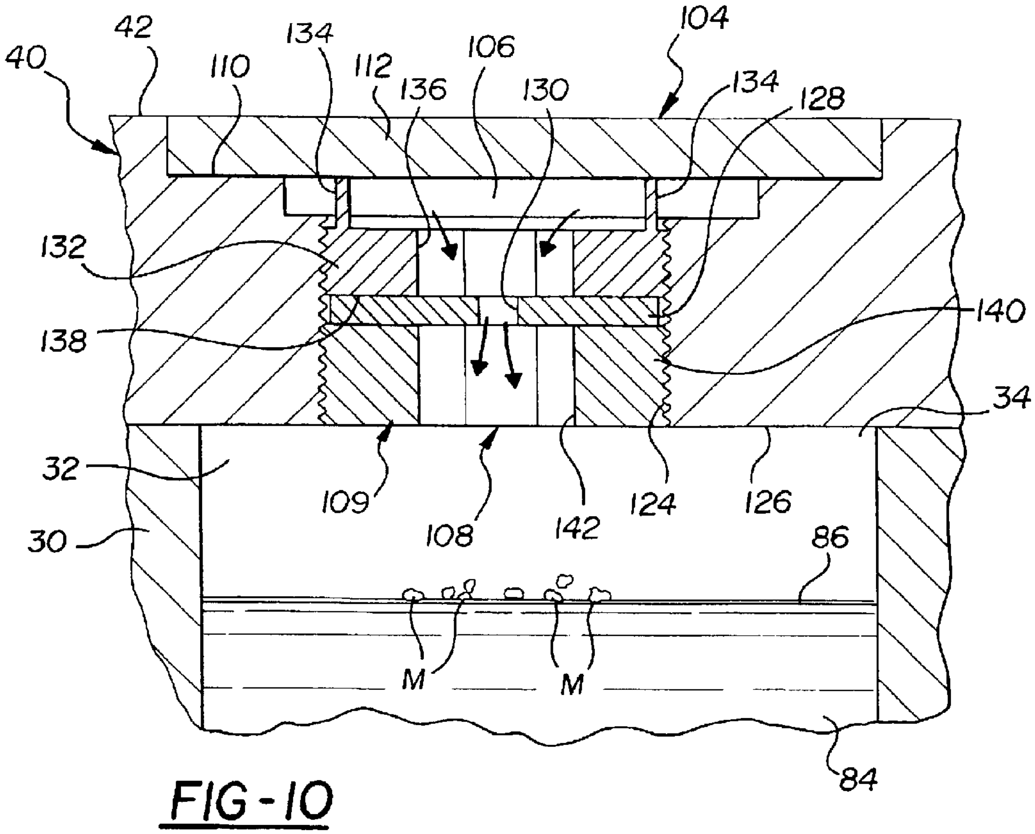
FIG-10
FIG-11
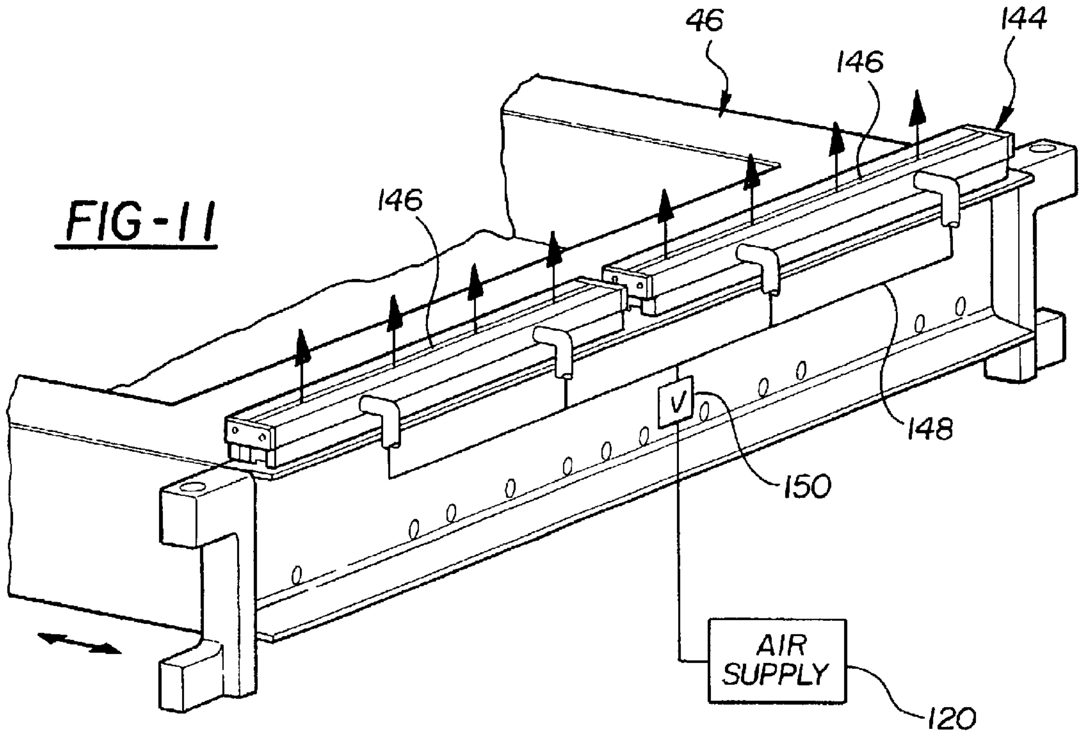

APPARATUS AND METHOD FOR MOLDING BLOCKS

This is a divisional patent application claiming the benefit of application Ser. No. 09/565,812 filed on May 5, 2000, now U.S. Pat. No. 6,425,751, which claims the benefit of the provisional patent application Ser. No. 60/140,082 filed on Jun. 21, 1999.

This invention relates to apparatus and methods for molding aggregate blocks.

BACKGROUND OF THE INVENTION

Apparatus for the mechanized molding of concrete blocks are well known, as exemplified by U.S. Pat. No. 3,679,340, the disclosure of which is incorporated herein by reference. Briefly, the molding of standard building blocks involves the introduction of moldable block material into a mold box or sleeve having fixed, straight-sided cavity walls that extend longitudinally between open top and bottom ends of the mold. A pallet is positioned to close the bottom of the cavity and a top plate, or template, overlies the top of the mold, and is formed with an opening aligned with the cavity to receive moldable block material into the cavity. The material is charged into the mold from a feed box which is moved from the side into position over the mold and discharges material through a bottom chute, after which it is returned clear of the mold. A stripper head is lowered from above into the cavity to close the top of the mold and engage the top of the material. With the cavity closed, the mold box assembly is vibrated which, together with the weight of the stripper head, serves to compact and shape the material into the form of a block. The completed block is vertically stripped through the bottom of the mold by lowering the pallet and stripper head together, and then is conveyed onward on the pallet for further processing. The stripper head is returned and a new pallet positioned against the bottom of the cavity to ready the mold for the next cycle.

It will be appreciated that the laterally immovable cavity walls restrict the type of block that can be produced in the mold to ones having straight-sided walls or side contours that extend in the longitudinal direction of stripping. Lateral undercuts or projections are not permitted, as such would interlock the block and cavity walls in the longitudinal direction, preventing stripping.

FIGS. 2 and 3 illustrate a complex block having such lateral undercuts and projections. A mold box whose parts split laterally has been employed to form such blocks, the mold parts having the appropriate projecting and recessed mold surfaces to impart the corresponding shape to the block. The mold parts are initially inwardly displaced to provide a laterally contoured mold cavity open at its longitudinally opposite top and bottom ends. The bottom of the mold is closed by a pallet, and a top plate overlies the top of the mold and has an opening therein aligned with the open top of the mold. A feed box is moved laterally into position over the mold between the top plate and the underside of an upper stripper head to deliver the block material into the mold cavity through a bottom shoot, after which the feed box is returned clear of the mold and stripper head.

As the feed box moves into and out of position, a wire brush carried along the top of the feed box sweeps across the underside of the stripper head to remove any block material that may have accumulated from the previous mold cycle. For this particular block, the underside of the stripper head is heavily contoured. Large depending features extend into the mold and help form the projecting side features of the block as well as shaping the top surface of the block during molding.

Following compaction of the block material within the cavity, the mold parts are laterally split and retracted beneath the top plate sufficiently to disengage the mold surface clear of the block, to permit subsequent longitudinal stripping of the completed block through the bottom of the mold through conjoint downward movement of the platform and stripper head.

Some difficulties have been encountered in forming such blocks having laterally extending side features using split mold tooling of the type described above. The block material tends to accumulate on the upper surfaces of the projecting portions of the mold tooling, particularly in the inside corner regions. The material must manually swept or blown from these regions between mold cycles, slowing the process and requiring the attendance of an operator. The block material also tends to accumulate on the underside surface of the stripper head. The traditional wire brush carried on the feed box is unable to reach the deep inside corner features where the material is most prone to accumulate. Further, those bristles that sweep across the large projecting features of the stripper head quickly fatigue and break off.

SUMMARY OF THE INVENTION

Apparatus for molding blocks having such laterally extending side contours includes the provision of a mold having a mold cavity that is open at the top and bottom thereof and a top plate overlying the mold formed with an opening aligned with the open top of the cavity for accommodating the charge of moldable block material into the mold. A bottom pallet is supported for movement into operative engagement with the bottom of the mold for closing the bottom of the cavity. A stripper head is supported above the mold for movement into the cavity through the open top to engage and shape the top of the material in the mold.

The mold includes at least one retractable liner member having an inner shape-imparting surface supported for engagement with a side of the block material during molding when in a first use position. The liner member is laterally movable out of engagement with the block material to a retracted position beneath the top plate for releasing the molded block material.

The shape-imparting surface of the liner member has at least one problem area that is susceptible to the accumulation of the moldable block material between mold cycles. According to the invention, the top plate includes a mold clean-out system having at least one fluid outlet in the top plate positioned to communicate with the problem area of the liner member surface when the liner member is in the retracted position. The cleanout system is operative to direct a flow of pressurized fluid such as air through the outlet and on to the problem area for removing any such accumulation of block material therefrom.

The invention has the advantage of incorporating the clean-out system in the top plate of the mold assembly with outlets strategically positioned for directing pressurized air onto the problem areas of the mold when in the retracted position between mold cycles. The clean-out system thus automates the cleaning of the molds without interruption of the molding process and without requiring the assistance of an operator.

According to another aspect of the invention, the air clean-out system includes an air knife mounted to the feed box having an air outlet positioned to direct a flow of high pressure air against the underside of the stripper head to remove any accumulated block material thereon. The air knife has the advantage of being able to remove accumulated material from all areas of the stripper head underside, including the deep inside corner regions where the traditional brush cannot reach. The air knife further avoids the problem of bristle damage associated with sweeping across largely projecting features of a stripper head underside.

THE DRAWINGS

A presently preferred embodiment of the invention is disclosed in the following description and in the accompanying drawings, wherein:

FIG. 10 is a fragmentary sectional view taken generally along lines 10—10 of FIG. 9; and FIG. 11 is a fragmentary perspective view of the air knife of the cleanout system shown mounted on the feedbox.

DETAILED DESCRIPTION

Figure 1:
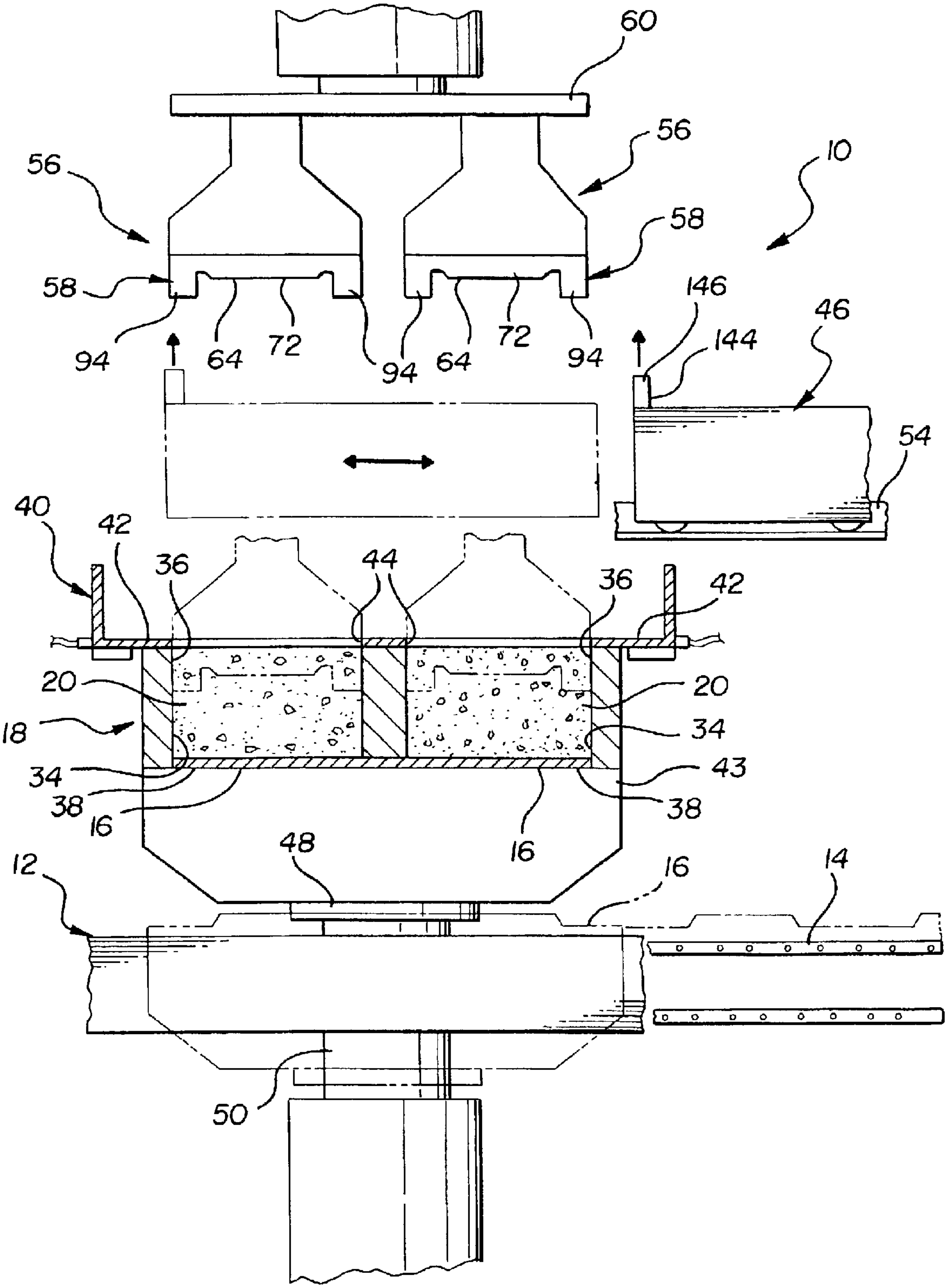
FIG. 1 is a longitudinal side elevational schematic view, partly in section, of the apparatus shown forming laterally contoured blocks according to the invention, the chain lines indicating alternative positions of the illustrated parts.

FIG. 1 illustrates a block making machine or apparatus 10 which, except for the mold assembly and associated cleanout system which will be described below, may be of the well known type for making aggregate or cementatious blocks in the manner disclosed, for example, in U.S. Pat. Nos. 2,566,787 and 3,679,340, the machines being available commercially from the Besser Company, Alpena, Mich.

Figure 2:
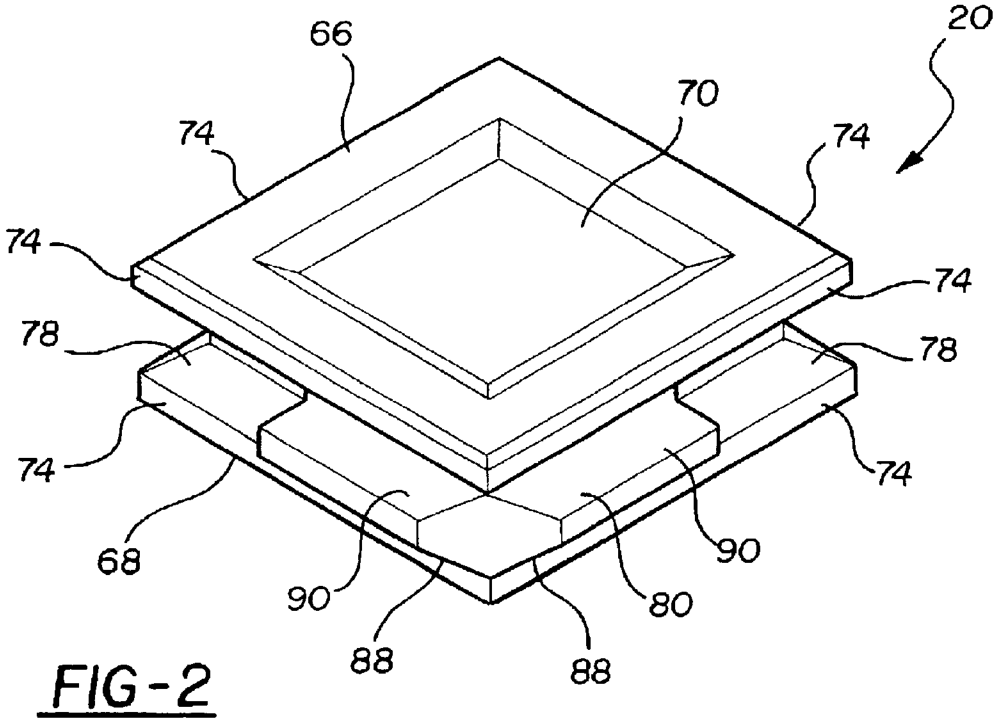
FIG. 2 is a top prospective view of a block made by the mold apparatus.
Figure 3:
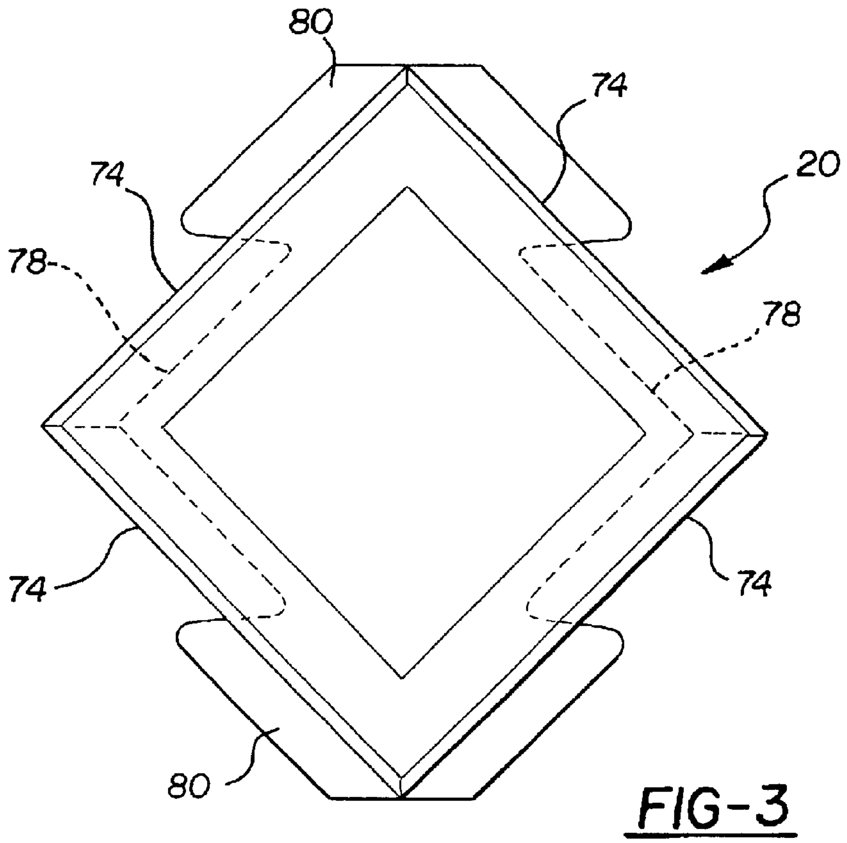
FIG. 3 is a top plan view of the block of FIG. 2.

The block making apparatus 10 includes a stationary support frame 12 mounting a conveyor 14 on which imperforate mold pallets 16 are transported in succession into position beneath a mold box assembly 18 in which the blocks 20, illustrated in FIGS. 2 and 3, are made.

As shown best in FIGS. 4–10, the mold box assembly 18 includes a rigid mold frame 22 which may be part of or attached to the framework 12 of the apparatus 10. The mold frame 22 includes a pair of spaced, parallel main side rails 24 that extend in the direction of conveyance of the pallets 16, and at least one and preferably at least two sets of spaced apart cross rails 26 extending between the side rails 24 and connected rigidly thereto to provide, in each case, a rectangular framed opening 28 in which a set of mold liners or parts 30 are supported, the inner walls 32 of which provide, at least in part, a mold cavity 34 that extends longitudinally between an open top 36 and an open bottom 38.

FIG. 1 schematically illustrates the provision of two such sets of mold parts defining side by side mold cavities 34.

Figure 5:
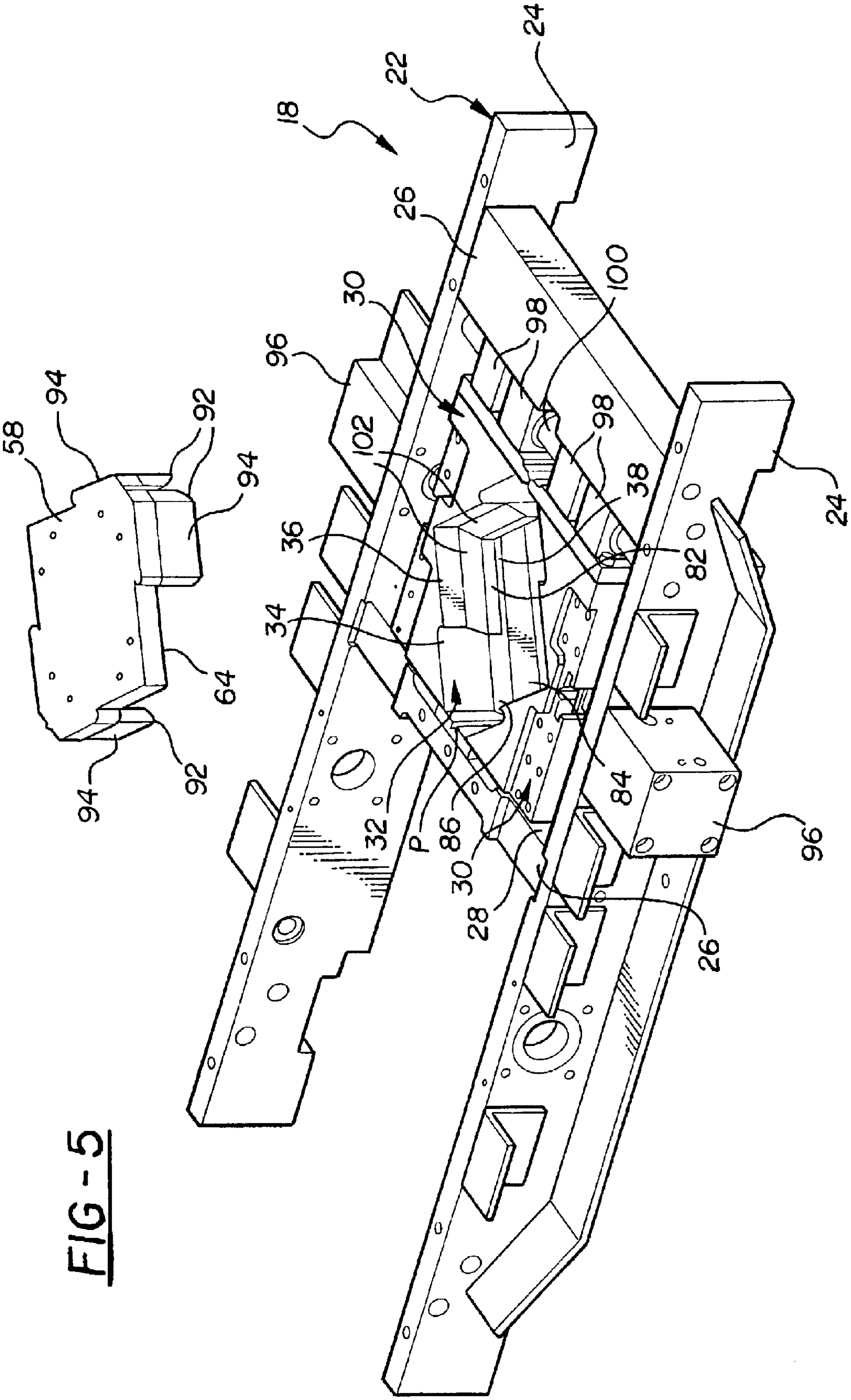
FIG. 5 is a perspective view of the mold parts of FIG. 4 with the liners assembled in the mold frame and the stripper heads shown positioned above the mold cavity, the stripper head and mold parts for the adjacent mold cavity being omitted for clarity.
Figure 9:
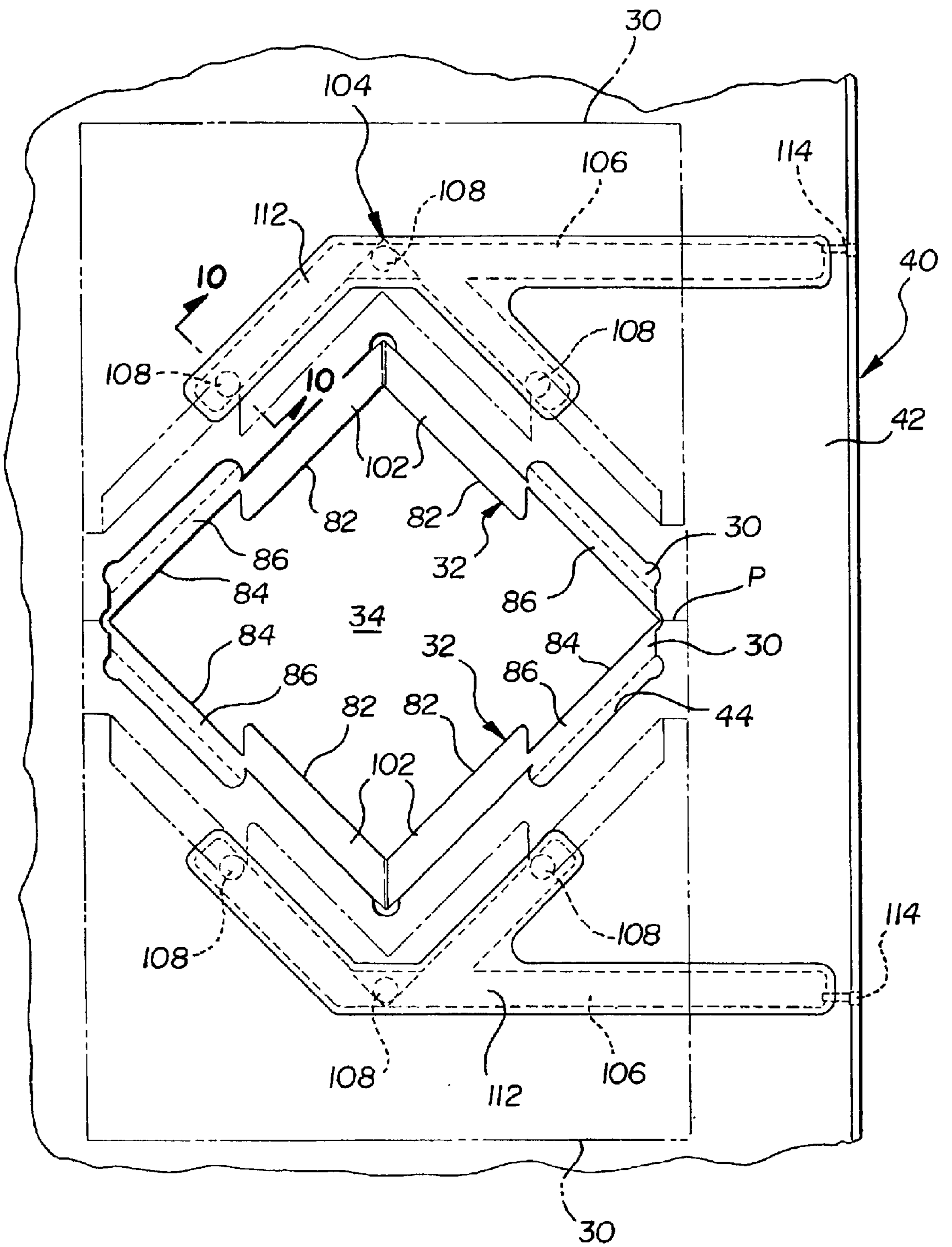
FIG. 9 is an enlarged fragmentary plan view of one of the mold cavities showing further details of the mold.

As shown best in FIGS. 5 and 9, the cavity 34 has a generally rectangular or square shape when viewed in plan. The mold parts 30 split along a longitudinal parting plane P extending diagonally from corner to corner across the mold cavity 34.

Figure 6:
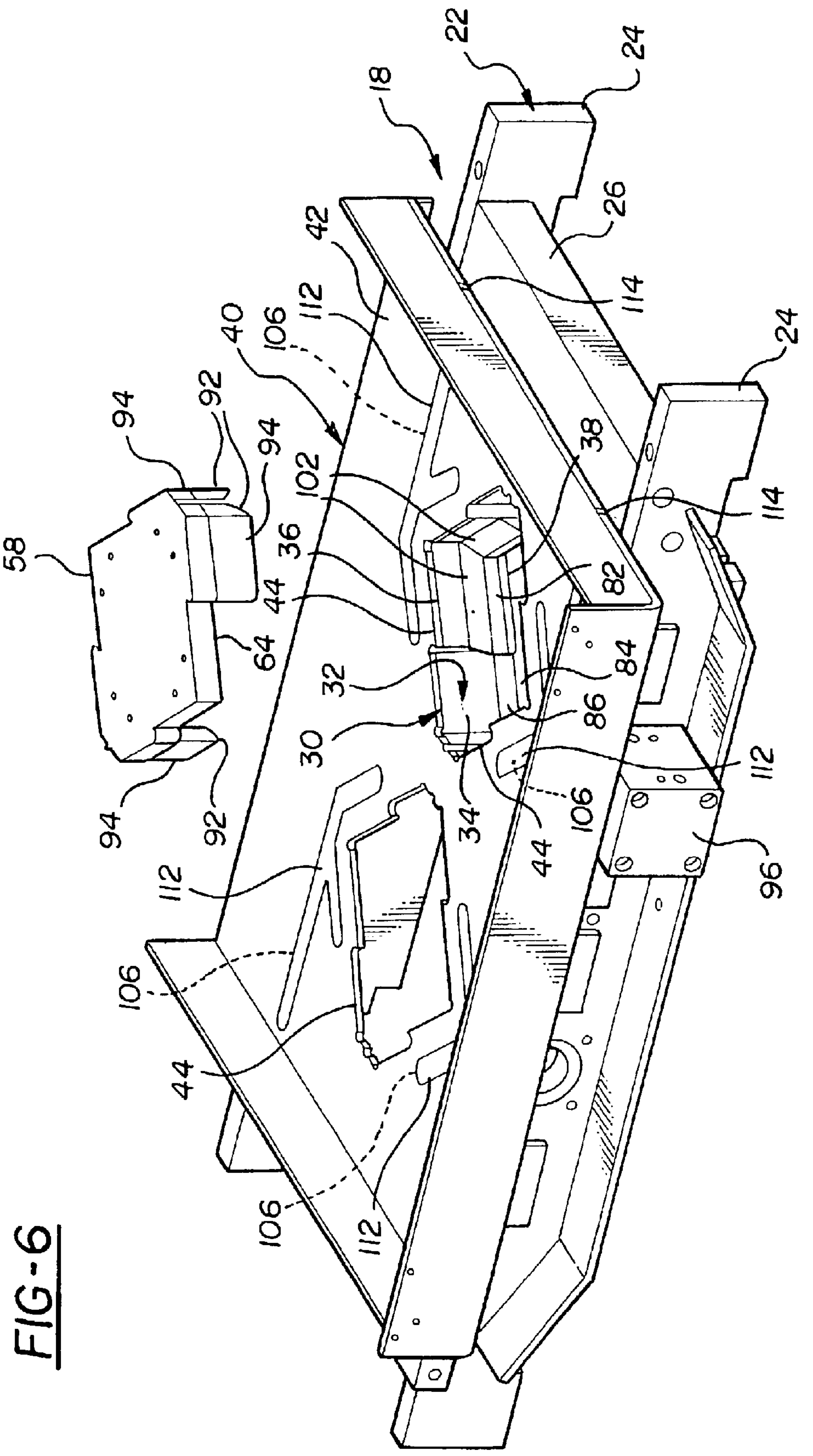
FIG. 6 is a view like FIG. 5 but showing the top plate installed.
Figure 7:
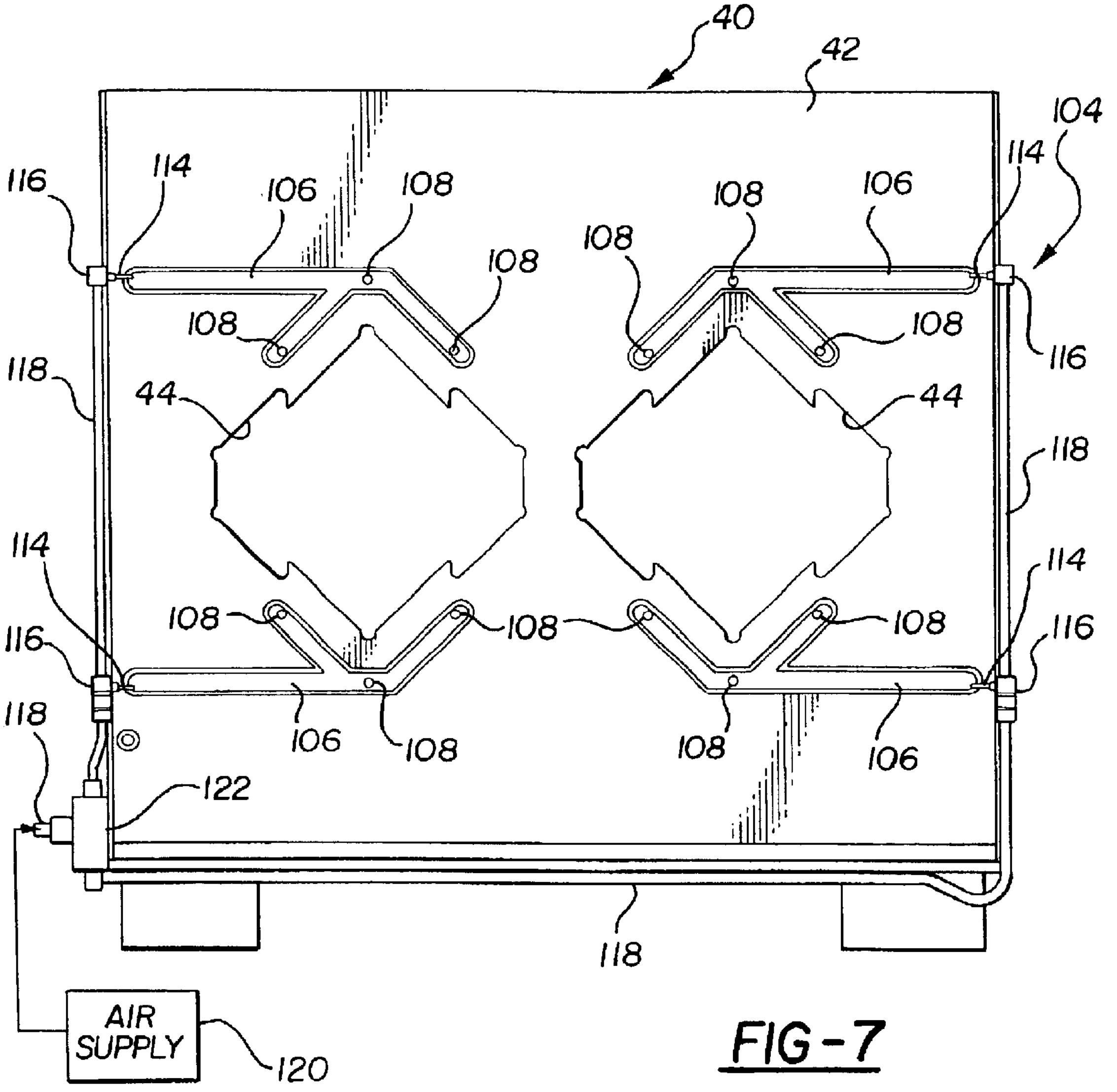
FIG. 7 is a plan view of the top plate incorporating the air clean outsystem of the invention.
Figure 8:
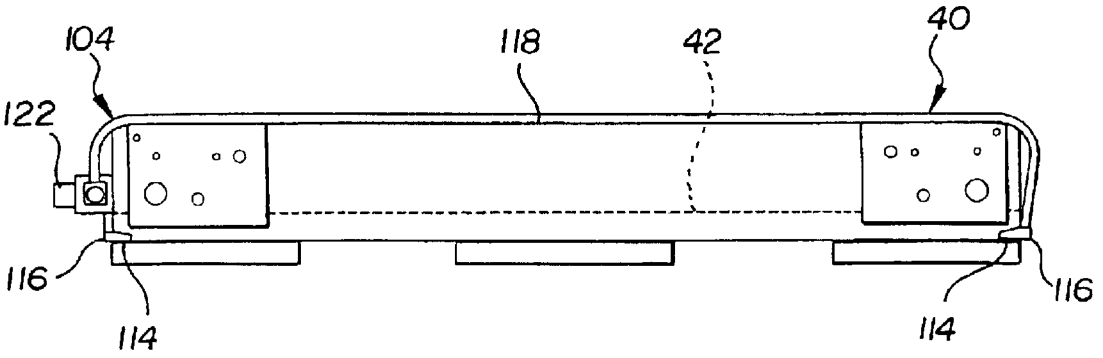
FIG. 8 is a front elevation view of the top plate of FIG. 7.

Overlying the mold parts 30 is a top plate 40 suitably fixed to the stationary mold frame 22 by bolts or the like. The top plate 40 includes a generally flat, planar deck 42 having at least one opening 44 therethrough, and in the illustrated example two such openings, corresponding in shape and aligned with the open top 36 of the mold cavity or cavities 34. The top plate 40 effectively serves as a template which restricts the passage of block material to the mold cavities 34 only, blocking the entry into regions of the mold surrounding the mold cavities 34. FIG. 6 shows the top plate 40 fixed to the mold frame 22 in overlying relation to the mold parts 30 as shown in FIG. 5. It can be seen that all but the mold cavities 34 are shielded by the top plate 40.

The mold frame 22 and top plate 40, as well as the mold parts 30 are supported by the main frame 12 against movement in the longitudinal direction (vertically with respect to FIG. 1). The open bottom 38 of the mold is supported above the conveyor line 14 enabling individual pallets 16, as shown, to be conveyed in succession into position beneath the mold box 18. Once positioned, a pallet 16 is engaged from below by a platform 43 mounted on a ram 48 of vertical cylinder 50, which is actuated to elevate the platform 43 into engagement with the underside of the mold box 18, as shown in FIG. 1, to close the bottom 38 of the mold.

A feed box 46 is supported above the top plate 40 for lateral rolling movement along a track 54. The feed box 46 is movable to a first position, shown in solid lines in FIG. 1, where it is located laterally adjacent the top plate 40 and mold box 18 clear of the mold cavities 34 for receiving a charge of moldable block material into the feed box 46. Once filled, the feed box 46 moves laterally inward to a second position, shown in broken chain lines, in which the feed box 46 overlies the top plate 40 in position to discharge the moldable block material into the open-toped mold cavities 34 through a bottom discharge of the feed box according to convention. Once the cavities 34 are filled, the feed box 46 is returned to the first position.

Also included in the block making apparatus 10 is a stripper head assembly, generally shown at 56, mounted above the mold box 18 and comprising a stripper shoe 58 associated with each mold cavity 34 depending from a common support or platen 60. The stripper shoes 58 have a perimetrical shape and size corresponding to that of the open top of the mold cavities 34 and to the top plate opening 44, and are aligned longitudinally with their respective mold cavities 34. The stripper shoes 58 are supported for reciprocal movement relative to the mold box 18 in the longitudinal direction by any suitable drive system, such as the illustrated fluid cylinder 62. The stripper shoes 58 move from an initial raised position shown in solid lines in FIG. 1, in which the stripper shoes 58 are supported clear of the movement of the feed box 46 to accommodate the filling of the mold cavities 34 with block material, and a lowered broken chain line position, in which the stripper shoes 58 are extended into the open top 36 of the mold cavity 34. The stripper shoes 58 are effective to compress the moldable block material in the mold box 18 and to subsequently strip the molded blocks therefrom.

Referring to FIGS. 2 and 3, the blocks formed in the molds 34 are generally indicated at 20 and are of symmetrical construction. Each block 20 includes opposite top and bottom faces 66, 68 which are generally flat, planar and parallel, and with the top surface 66 formed with a central recess 70 impressed in the block 20 by an inversely shaped center projection 72 provided on the shoe 58. The block 20 has a generally square perimeter with straight side margins 74 formed by corresponding straight-sided surface portions of the mold parts 30 and stripper shoe 58.

The block 20 further includes features that extend laterally relative to the straight-sided margins 74, including recessed or undercut regions 78 extending into the block 20 from the side and having a generally V-shaped configuration when viewed in plan, as best seen in FIG. 3. The block 20 also includes laterally outwardly projecting regions 80 adjacent the recessed regions 78 extending beyond side margins 74 of the block B. The projecting regions 80 interlock with the recessed regions 78 of adjacent blocks B.

The lateral regions 78, 80 of the block 20 are formed by corresponding laterally extending features of the mold 18. As illustrated best in FIGS. 5 an 9, the mold parts 30 have laterally inwardly projecting regions 82, extending into the cavity 34 forming the undercut regions 78 of the block 20. The regions 82 thus have an inverse V-shape to that of the undercut regions 78. The projecting regions 80 of the block 20 are formed in part by projecting ledges 84 of the mold parts 30 whose sloped upper surfaces 86 are shaped to compliment and form the corresponding lower tapered surfaces 88 of the projecting regions 82 of the block 20. Opposite upper tapered surface 90 of the projecting block regions 82 are shaped by lower tapered surfaces 92 of the stripper shoe 58 provided on a set of longitudinal depending features of the stripper shoe 58 opposite the ledges 84 of the mold.

The moldable block material is compacted in the usual way through vibration of the mold box assembly 18 and the weight of the stripper shoe 58. The moldable block material may be of the usual cementatious aggregate type employed in conventional block making, from such materials as sinter, slag, concrete, and the like.

It will be appreciated that the laterally projecting features of the block and mold become interlocked with one another precluding vertical stripping of the mold in a longitudinal direction of the mold box in the usual manner by simply advancing the block to the bottom of the mold. According to the invention, the lateral features of the mold are retractable laterally outwardly away from the block to accommodate stripping of the block.

Figure 4:
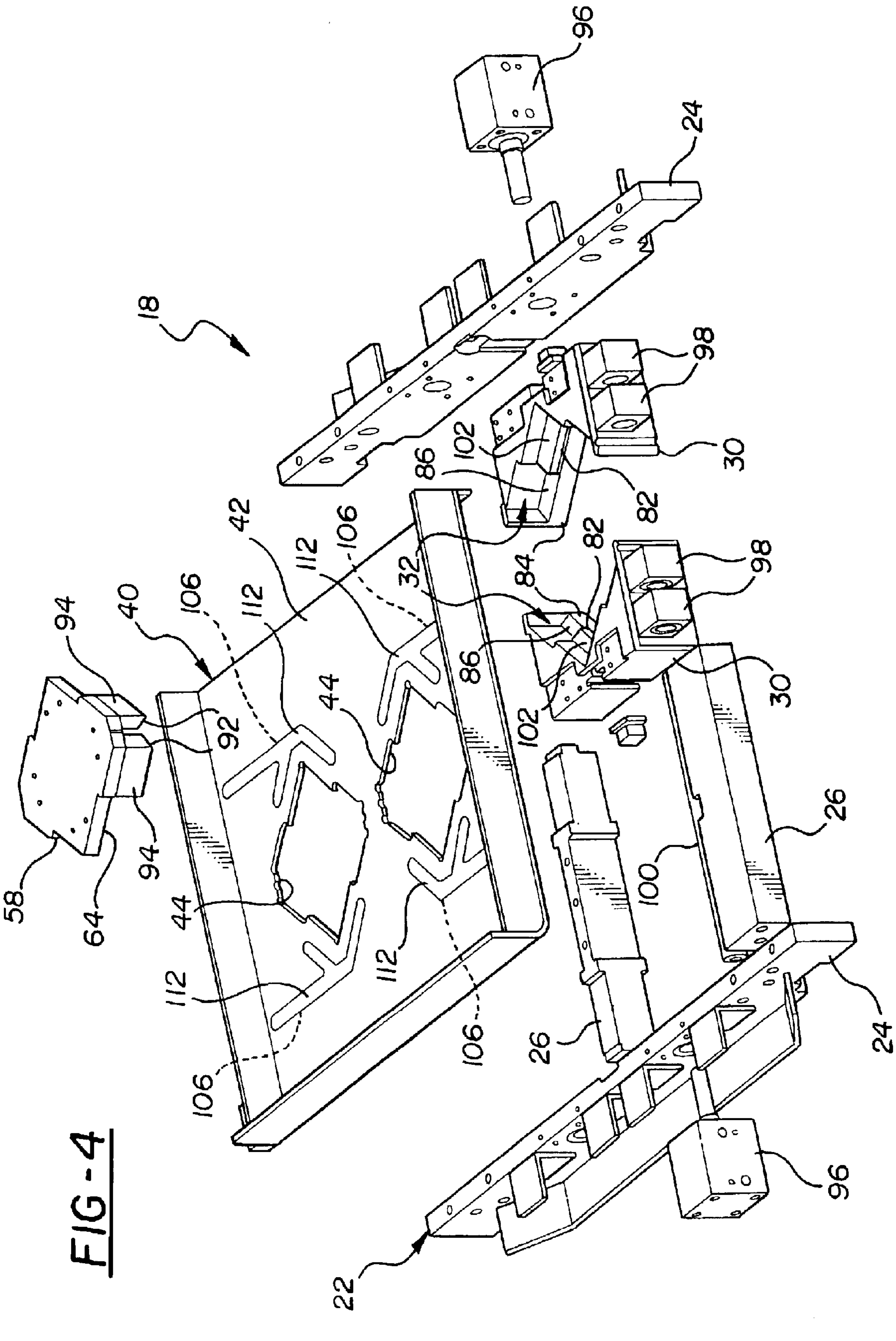
FIG. 4 is an exploded prospective view showing parts of the mold.

As illustrated in FIGS. 4 and 5, the mold parts 30 are each coupled to a linear actuator 96 mounted on the main side rails 24 of the mold frame 22. The mold parts 30 carry guide blocks 98 that are slidably supported on adjacent guide rails 100 extending between the side rails 24 of the frame 22 for lateral movement of the mold parts 30 on the frame 22 toward and away from one another. The mold parts 30 are movable to an inwardly displaced use position, shown in FIGS. 5 and 6, and illustrated in solid lines in FIG. 9, to provide the side walls 32 of the mold cavity 34 for engaging and shaping the material. Between mold cycles, the mold parts 30 are movable to a laterally outwardly displaced position, illustrated by broken chain lines in FIG. 9, in which the mold parts 30 including the projecting regions 82, 84 are retracted beneath the top plate 40 for fully disengaging and unlocking the mold 18 from the block 20 to facilitate subsequent stripping of block 20 from the mold 18. With the mold parts 30 retracted, the block 20 is stripped by simply advancing the stripper head 56 and pallet 16 conjointly downwardly to remove the block 20 through the bottom 38 of the mold box 18 to a lowered position in which the pallet 16 will rest on the conveyor 14. The completed block 20 is conveyed onward for further processing, during which another pallet 16 may be moved into position beneath the mold box 18 and the stripper head 56 returned to its raised position for commencing the next mold cycle.

One problem encountered with use of the split mold tooling having such lateral extending features is that residual block material has a tendency to accumulate on the upper surfaces 86 of the ledges 84 of the mold parts 30, as well as on the upper surfaces 102 of the V-shaped projecting regions 82 of the mold parts 30, particularly in the vicinity of the inside corner regions.

According to the invention, a mold clean-out system 104 is provided for cleaning any accumulative block material from these problem areas of the mold parts 30. With particular reference to FIGS. 7–10, the mold clean-out system 104 includes a series of fluid passages or channels 106 provided in the top plate 40 having bottom outlets 108 fitted with nozzles 109 positioned to communicate with the predetermined problems areas of the mold parts 30 when in the retracted position, shown in broken chain lines in FIG. 9. The clean-out system 104 is operative to direct a flow of high pressure fluid, such as air or other flowable fluids such as liquid silicone against such problem areas for removing the mold material between mold cycles.

The channels 106 are preferably machined into the upper surface of the top plate 40 and branched as necessary to extend the channel 106 to the targeted problems areas. The channels 106 are preferably countersunk about the perimeter of the channel 106 to form a relatively wider recessed seat 110 in which correspondingly shaped cover plates 112 are fixed in air-tight manner such as by welding or the like to close the top of the channels 106. As shown best in FIGS. 7 and 9, fluid inlet passages 114 are bored from the side of the top plate 40 into the channels 106 and mount fittings 116 coupled to a network of fluid supply lines 118, which are in turn coupled to a high pressure fluid supply 120 and suitable flow control valve 122. In the FIG. 7 view, the cover plate 112 of the air channels 106 is omitted to show internal details of the air clean outsystem 104, including the configuration of the channels relative to the top plate opening 44 and the three locations of the outlets 108 on either side of the opening 44 in line with the inside corner regions of the lateral extending features of the mold parts 30, as illustrated by the broken chain line position of the mold parts of FIG. 9 relative to the outlets 108.

Details of the preferred outlet 108 construction are illustrated in FIG. 10, wherein at each location of an outlet 108, a threaded opening 124 is bored from the channel 106 through to a bottom surface 126 of the top plate 40. An orifice plate 128 is mounted within the opening 124 and is formed with an orifice 130 for regulating the flow and pattern of clean-out fluid passing therethrough and directed onto the trouble areas of the mold tooling 30. The orifice plate 128 is preferably removable to facilitate the changing of one orifice plate for another having the same or different orifice configuration for adjusting the flow and pattern of fluid onto the mold parts 30.

The nozzles 109 each include an externally threaded set screw sleeve or spacer 132 threaded into the opening 124 ahead of the orifice plate 128 and provided at its leading end with at least one and preferably at least a pair of ears 134 which engage the cover plate 112 to limit the extension of the sleeve 132 into the opening 124 and to maintain the channel 106 in open flow communication with a central opening 136 of the sleeve 132. The central opening 136 may be formed with suitable flats or the like, such as a hexagonal configuration, for engagement by a tool to facilitate installation of the sleeve 132. The sleeve 132 presents a seat 138 for engagement by an upper surface of a orifice plate 128.

A retainer 140 in the preferred form of an externally threaded set screw sleeve similar to that of the spacer 132 but lacking the ears 134, is threaded into the opening 124 following installation of the orifice plate 128 and tightened to secure the orifice plate 128 in position between the sleeves 132, 140. The retention sleeve 140 likewise has a central opening 142 for the passage of clean-out fluid preferably provided with similar flats for engagement by an installation tool.

FIG. 10 illustrates the operation of the clean-out system 104. Residual block material M is shown present on an upper surface problem area 86 of the mold tool 30. Pressurized fluid, and preferably air from the channel 106 is directed through the nozzle 109 onto the block material M, where it is blown clean from the mold surface 86 to ready the mold for the next cycle. The same occurs at each of the problem areas targeted by the outlets 108. Once cleaned, the mold parts 30 are returned to their inwardly displaced use positions to ready the mold box 18 for the next mold cycle.

According to a further aspect of the invention, and referring to FIGS. 1 and 11, the clean-out system 104 includes an air knife 144 mounted to the feed box 46 and communicating with a source of pressurized air 120 through suitable air lines 148 and valving 150. The air knife 144 includes an outlet slot 146 positioned to direct a curtain of pressurized air upwardly against the underside surface 64 of the stripper shoe 58 during movement of the feed box 46 into and out of position over the mold box 18. The curtain of air is operative to clean any residual block material M off the stripper shoe 58, and particularly the inside corner regions adjacent the large projections 94 where there is a tendency to accumulate such material.

The disclosed embodiment is representative of a presently preferred form of the invention, but is intended to be illustrative rather than definitive thereof. The invention is defined in the claims.

What is claimed is:

1. In a method of cleaning accumulated block making material from problem areas of split mold tooling used in the manufacture of molded blocks having a set of mold parts supported below a top plate for movement between a first inward use position in which inner surfaces of the mold parts cooperate to provide a mold cavity that is open at a top and bottom of the mold along an axis thereof and a second position in which the mold parts are moved away from one another laterally of said mold axis to a position in which the mold surfaces are retracted beneath the top plate, said method comprising:

moving the mold parts to the inward use position to form the mold cavity and positioning a pallet against the bottom of the mold to close the bottom of the cavity;

supplying a charge of moldable block material into the cavity through the top opening of the mold;

lowering a stripper head into the mold cavity while vibrating the mold to compact and shape the block material to the desired form;

moving the mold parts laterally away from one another to release the molded block such that the mold surfaces are retracted beneath the top plate; the improvement comprising:

providing a mold clean-out system having at least one fluid channel having an outlet in the top plate positioned so as to communicate with the mold surfaces when in the retracted positions; and directing a flow of pressurized clean-out fluid through the outlets against the mold surfaces while in the retracted position to remove any block material present on such surfaces.

2. The method of claim 1 wherein the surfaces of the mold parts have portions that project laterally inwardly of the cavity and present an upper should surface susceptible to the accumulation of the block material between mold cycles, with the improvement further comprising locating the outlets of the clean-out system so as to direct said flow of fluid at such areas.

3. The method of claim 2 including providing a feed box for movement between a first position adjacent the top plate and a second position above the top plate and stripper head for charging moldable material into the open top of the mold cavity, with the improvement further comprising providing an air knife on the feed box having an air outlet positioned for directing a flow of pressurized air against an underside surface of the stripper head during such movement of the feed box between its first and second positions for cleaning any accumulated block material from the underside surface.

* * * * *